March 7, 1950
H. C. MacCONNELL, JR
2,500,083
DOUBLE VACUUM BOTTOM PLATE AND TAKE-OUT
MECHANISM FOR GLASSWARE BLOW MOLD
Filed Dec. 9, 1947
3 Sheets-Sheet 1
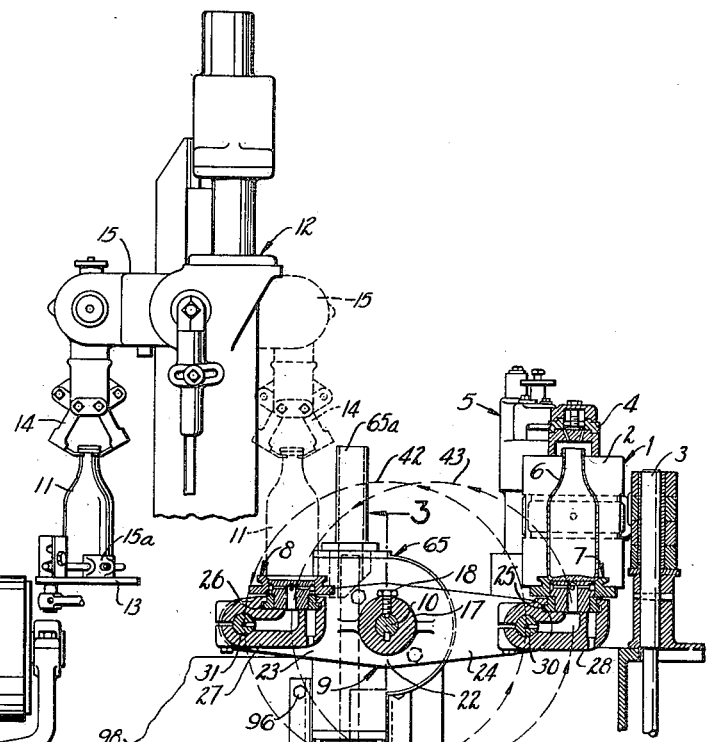
INVENTOR
HUGH C. MacCONNELL JR
BY Parham & Bates
ATTORNEYS

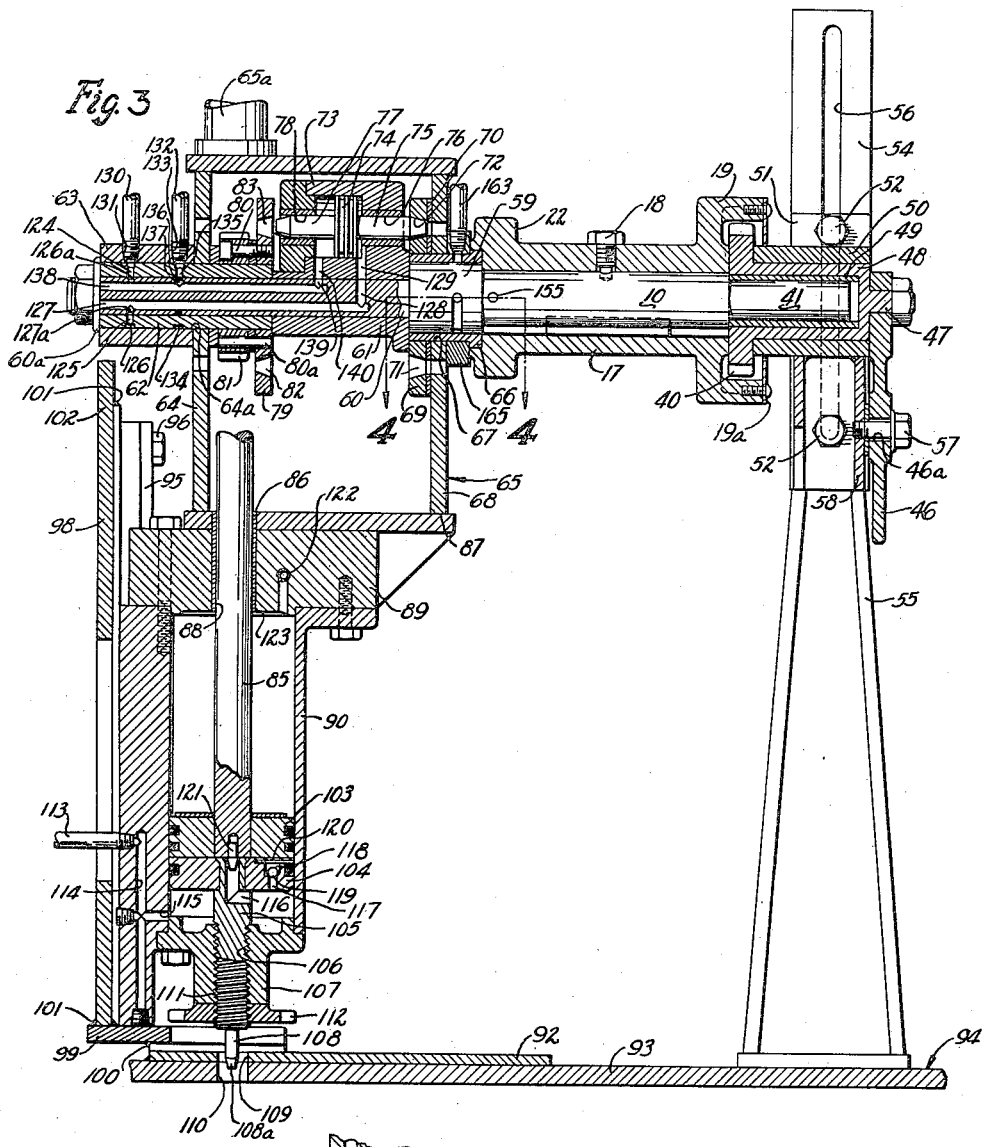
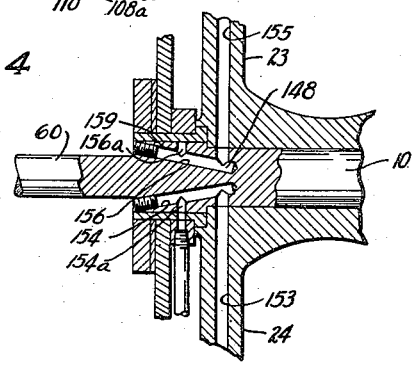

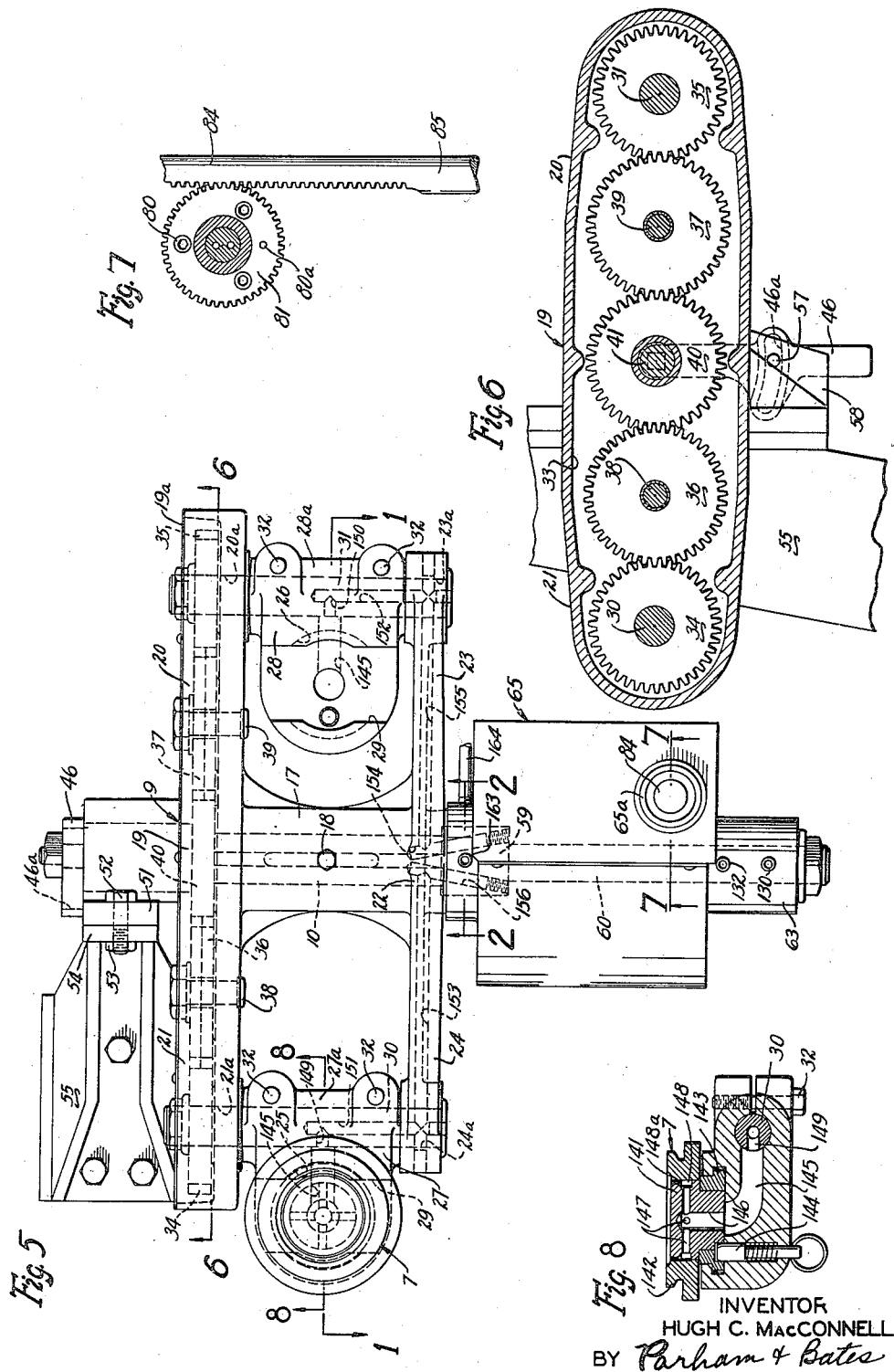

Patented Mar. 7, 1950

2,500,083

UNITED STATES PATENT OFFICE 2,500,083

DOUBLE VACUUM BOTTOM PLATE AND TAKE-OUT MECHANISM FOR GLASSWARE BLOW MOLD

Hugh C. MacConnell, Jr., West Hartford, Conn., assignor to Hartford-Empire Company, Hartford, Conn., a corporation of Delaware Application December 9, 1947, Serial No. 790,506

8 Claims. (Cl. 49—18)

This invention relates generally to improvements in glassware forming machines, especially those of the type having final blow molds located in a relatively fixed position, such, for example, as the Hartford I. S. machine, one form of which is disclosed in Ingle Patent 1,911,119 of May 23, 1933.

A forming machine as above referred to comprises openable and closable fixed position blow molds, each of which has associated therewith cooperative mechanisms employed in glassware forming operations, such mechanisms comprising a bottom plate for the blow mold, a blow head movable to and from operative position on the blow mold, a take-out for removing finally blown ware from a blow mold, and, of course, a parison transfer mechanism for delivering successive parisons to the blow mold. A considerable amount of valuable blow mold contact time is lost in a cycle of operations of these cooperative mechanisms, due to mechanical motions necessary to enable such mechanisms to perform their functions, including removal of the hot, finally blown ware from the mold. Also, rates of production of glassware by a mold are frequently limited by the tendency of the relatively hot bottoms of the finally blown articles to "drop" or otherwise go out of shape when they have been lifted from the mold bottom plate of the prior equipment.

An object of the present invention is to improve the molding equipment of a forming machine of the general type described so as to substantially reduce the time lost in mechanical motions, thereby permitting an increase in the mold contact time without increasing the overall time for a cycle of operations of the molding mechanisms.

A further object of the invention is to provide in a cycle of operations of the mold mechanisms a substantial increase in the bottom plate contact time, thereby obviating the tendency of the relatively hot bottoms of the finally blown ware to "drop" or otherwise go out of shape.

A still further object of the invention is to provide an improvement in molding equipment which, by assisting in the exhaust of expanding gases around the parison on its delivery to the blow mold, will obviate collapse of such parisons in the blow mold before internal blowing pressure has been applied to or becomes effective therein.

A still further object of the invention is to provide improvements in the assembly of cooperative mechanisms employed for the final blowing of a parison in the blow mold and the removal of the finally blown article from the blow mold such that the finally blown article is suitably supported for after-cooling, thereby permitting finally blown articles to be removed earlier from the blow mold.

In carrying out the present invention, I may provide two identical bottom plates for each final blow mold together with operating means therefor of such a character that the plates are used alternately in molding operations, each serving in turn as the active bottom plate for the blow mold and then to take out a blown article from the mold and to move it to a position spaced from the blow mold station while the other plate returns from the latter station to position to serve as the active bottom plate at the blow mold station. The movements of the bottom plates are coordinated with the movements and operations of the other elements of the molding assembly so that a considerable saving of possible mold contact time is effected. Provision is made for applying vacuum through the bottom plates during part of the cycle of each plate. Thus, when each bottom plate is in its active position at the bottom of the blow mold, the suction applied thereby may assist exhaust of expanding gases from the blow mold and thus remove a cause of collapse of a newly delivered parison therein.

The bottom plates preferably are carried at the ends of a carrier which is rotated, 180° at a time, about a horizontal axis located intermediate such ends. After a molding operation, indexing of the carrier about its horizontal axis through 180° will move the previously active bottom plate with the finally blown article thereon through the space provided by opening the sections of the blow mold to the horizontally spaced position previously occupied by the second bottom plate, while the latter is moved by the indexing of the carrier to the position previously occupied by the active bottom plate. In moving to this latter position, the bottom plate may swing along an arc approaching the blow mold from below so that time and space are provided for operation of the parison transfer means by which a new parison is delivered to the blow mold.

Some of the advantages of the invention and other objects thereof will hereinafter be pointed out or will become obvious from the following description of a practical embodiment of the invention, as disclosed in the accompanying drawings, in which:

Fig. 1 is a fragmentary view, partly in elevation and partly in vertical section approximately along the line 1—1 of Fig. 5, showing the novel double vacuum bottom plate and take-out mechanism and the blow mold for which it is provided, together with other associate mechanisms and adjuncts;

Fig. 2 is a relatively enlarged section through a vacuum control valve which is included in such mechanism;

Fig. 3 is a relatively enlarged, fragmentary vertical section through the double vacuum bottom plate and takeout mechanism, the view being substantially along the lone 3—3 of Fig. 1;

Fig. 4 is a fragmentary, horizontal section substantially along the line 4—4 of Fig. 3, showing the vacuum valve and portions of connected vacuum passages;

Fig. 5 is a plan view of the double vacuum bottom plate and take-out mechanism with the right-hand bottom plate omitted;

Fig. 6 is a vertical section through a portion of the carrier for the two bottom plates, substantially along the line 6—6 of Fig. 5, showing a gear train of a parallel motion transmission for keeping the bottom plates horizontal during all movements of the carrier;

Fig. 7 is a fragmentary view substantially along the line 7—7 of Fig. 5, showing rack bar and pinion elements of the carrier operating mechanism; and Fig. 8 is a vertical section through one of the bottom plates and its holder, on line 8—8 of Fig. 5.

In Fig. 1, the numeral 1 generally designates a blow mold which may comprise openable and closable halves, as is usual, only one of these halves, specifically marked 2, being shown. These mold halves are mounted to swing about the axis of a vertical supporting shaft 3 for opening and closing of the mold, as also is usual. The means for opening and closing the halves of the mold 1 may be any conventional mechanism suitable for that purpose, such as the mold opening and closing mechanism disclosed by the aforesaid Ingle Patent 1,911,119.

Associated with the blow mold 1 is a blow head 4, supported and operated by a mechanism generally indicated at 5 which may be of any suitable known construction and mode of operation, such, for example, as are disclosed in the Ingle Patent 1,911,119. As shown in Fig. 1, the blow head 4 is in blowing position on the blow mold 1 and has completed the blowing therein of a bottle, indicated at 6. This bottle rests upon a bottom plate, generally designated 7, which is in active position, being partially overlapped and held by the closed halves of the mold 1. The bottom plate 7 is one of two similar bottom plates which are provided according to the present invention, the other bottom plate being generally designated 8 in Fig. 1. These bottom plates, respectively, are carried by the opposite ends of a carrier, generally designated 9. This carrier is shown as mounted intermediate its length on a horizontal shaft 10. As shown in Fig. 1, the plate 8 supports thereon a previously formed bottle, shown in dash lines and designated 11. Cooling of the bottle 11 at the station at which the plate 8 is located will take place naturally to some extent and the contact of this bottle with the plate 8 will result in extraction of heat therefrom so as to avoid "dropping" or other change of shape of the bottom thereof when such bottle is removed from the plate. Means, not shown, may be provided to subject the bottle 11 to forced cooling while on the plate 8, if desired. When the carrier is indexed 180° counterclockwise from the position shown in Fig. 1, the positions of the plates 7 and 8 will be reversed.

A take-out mechanism, generally designated 12, in Fig. 1, may be provided to remove the bottle 11 from the plate 8 and transfer it to an appropriate station or place, as onto a dead plate 13 on which the bottle 11 is shown in full lines in Fig. 1. This take-out mechanism may be of any suitable known construction and mode of operation, such, for example, as the take-out mechanism of the disclosure of the Ingle Patent 1,911,119. Such mechanism comprises take-out tongs 14 and an oscillatory arm, designated 15, carrying such tongs. The mechanism is operable to swing the arm 15 between the full line position and the dash line position of Fig. 1, the tongs 14 being carried by the arm and being shown in full lines in its position over the dead plate 13 and in dash lines in its position over the plate 8. The take-out mechanism also is operable to open and close the tongs at the proper times so that these tongs may be actuated to pick up the bottle 11 from the plate 8, as indicated by the dash lines and to transfer it onto the dead plate 13, as indicated by the full lines. From the dead plate 13, the bottle may be moved by a pusher 15a onto an adjacent conveyor 16.

Novel structure embodied in the double bottom plate and take-out mechanism of the present invention will now be more particularly described. The carrier 9 comprises a hub 17 mounted on the shaft 10 and secured thereto, Figs. 1, 3 and 5. The fastening means for the hub 17 may include a set screw 18. One end of the hub 17 carries an open-faced, elongate hollow member 19, comprising a pair of opposite end portions, designated 20 and 21, respectively, projecting oppositely from the hub equal distances from the axis thereof. The connection of the end of the hub 17 with the member 19 may be integral as shown in Fig. 3. A cover, as 19a, may be applied to the open-faced member 19. At its opposite end, the hub 17 carries a second elongate member, designated 22, having opposite end portions 23 and 24, respectively, extending parallel with the end portions 20 and 21, respectively, of the open-faced member 19 as clearly shown in Fig. 5. The member 22 also may be integral with its end of the hub 17 as appears from Fig. 3.

The bottom plates 7 and 8 are removably seated in bayonet sockets 25 and 26, respectively, in the top portions of short, plate holder arms 27 and 28, respectively, these sockets being transversely slotted as indicated at 29, Fig. 5, to permit insertion and removal of the plates in a conventional manner. These holder arms 27 and 28 have attaching end portions in the form of longitudinally split collars 27a and 28a embracing shafts 30 and 31, respectively, which extend across the spaces between and have their end portions journaled in suitable bearings 21a, 24a and 20a, 23a, respectively, in the parallel end portions of the carrier members 19 and 22. See Fig. 5. The holders are made fast to their shafts in a conventional manner, see Fig. 8, as by cap bolts 32 connecting the component parts of their split collar portions.

The shafts 30 and 31, respectively, project at one side of the carrier into opposite end portions of a chamber 33 in the elongate hollow carrier member 19 and carry gears 34 and 35, respectively, in that chamber. See Figs. 5 and 6. These gears are in mesh with intermediate idler gears 36 and 37, respectively, on short shafts 38 and 39 carried by the carrier member 19. The gears 36 and 37 are both in mesh with a gear 40 on a projecting end 41 of the shaft 10 on which the hub of the carrier is mounted. All these gears are housed within the chamber 33 of the carrier part 19 and provide parallel motion transmissions to keep the respective bottom plate holders in their original angular relationship to the horizontal as they are revolved in circles about the horizontal axis of the carrier by the rotation of the carrier about that axis. Thus, when the holders are positioned to be horizontal when the carrier is horizontal, the carrier may be rotated about its axis to move the axes of the shafts 30 and 31 along the circle indicated at 42 in Fig. 1 and the bottom plates 7 and 8 along the circle indicated at 43 in Fig. 1 without either of these bottom plates swinging about the axis of its own shaft from a horizontal position. Any other suitable parallel motion or other known motion transmitting connections may be provided for the holders for the bottom plates.

A handle 46, Figs. 3 and 6, is fixed to a projecting axial end portion 47, Fig. 3, on a sleeve 48 which constitutes the hub of the gear 40. This sleeve 48 is provided with a liner 49 on shaft 41. The sleeve 48 is journaled in a bearing sleeve 50 on a plate 51 which is secured, as by bolts 52 and nuts, one of which is shown at 53 in Fig. 5, to a vertically disposed attaching plate 54 on a supporting pedestal or column 55. The bolts 52 extend through a vertical slot 56 in the attaching plate 54 to permit vertical adjustment of the bearing sleeve 50. The handle 46 is provided with an arcuately slotted intermediate portion 46a, Figs. 3 and 6, through which a cap bolt 57 extends into a structural member 58 that is carried by the attaching plate 54. By loosening the cap bolt 57 and swinging the handle 46, the middle gear 40 may be turned to adjust the holder arms 27 and 28 in unison about their individual pivotal axes. This adjustment may be used to determine the position of the active bottom plate in relation to the mold with which it cooperates. Of course, the other bottom plate will be correspondingly adjusted but in the opposite direction.

The shaft 10 is integral at its end opposite the shaft 41 with a slightly larger relatively short shaft section 59, which constitutes a rotary core of a vacuum valve, hereinafter to be further described. The shaft section 59 is integral with a relatively smaller end shaft section 60 which extends through successive sleeves 61 and 62. These are independently rotatable on such shaft but may at times be clutched together to rotate in unison as presently will be explained.

The sleeve 62 is mounted in a stationary sleeve 63 which is made fast by any suitable means, none shown, to the outer side of a vertically disposed, side wall 64 of a box-like housing, generally indicated at 65. The sleeve 62 is journaled in the sleeve 63 and in an aligned opening 64a in the side wall 64. The relatively large shaft section 59 extends through and is rotatable in a sleeve 66 which extends through an opening 67 in a vertically disposed side wall 68 which is included in the box-like housing 65 opposite to the side wall 64, the sleeve 66 being aligned with the opening 64a and sleeve 63. A latching disc 69 is fast on an end portion of the sleeve 66 within the housing 65, being spaced from the end wall 68 by a spacing disc 70. The plate 69 has two apertures 71 and 72, respectively, formed therein, spaced 180° apart around the axis of the shaft 59. In the embodiment of the invention shown, the aperture 72 is located directly above the aperture 71. A cylinder 73 also is disposed within the box-like housing 65, being mounted on the sleeve 61 to turn with the latter. A piston 74 is reciprocable in the cylinder 73 along a path parallel with the axis of the shaft 60. An axial pin 75 projects from the piston 74 through a suitable opening 76 in the end of the cylinder 73 next to the disc 69. This pin is of sufficient length to extend into one of the apertures 71 or 72 in the disc 69 when the piston 74 is at the end of its stroke in the cylinder 73 nearest to the disc 69 and the cylinder 73 is positioned angularly around the axis of the shaft 60 with its piston and the pin 75 aligned with one of such apertures. As shown in Fig. 3, the pin 75 projects into the aperture 72, the cylinder being at the top of its path of revolution about the axis of the shaft 60. When that condition exists, the shaft 60 and the parts integral therewith and fast thereto are locked to the stationary box-like housing 65.

The piston 74 has a pin 77 projecting from its other end axially thereof through a suitable opening 78 in the opposite end of the cylinder 73. A clutch disc 79 on the adjacent end of the sleeve 62 is fastened, as by a bolt 80 and a dowel 80a, to a pinion 81 on the same sleeve, both the clutch disc 79 and the pinion 81 being located within the box-like housing 65. The clutch disc 79 has apertures 82 and 83 thereon, spaced 180° apart, and each adapted for the reception of the pin 77 when the piston 74 has been moved from the position shown in Fig. 3 to the opposite end of the cylinder 73 and one or the other of apertures 82 and 83 is in alignment with the opening in the adjacent end in the cylinder 73. As shown, the aperture 83 is in position to receive the end of the pin 77 when the latter is moved to the left in Fig. 3 by the piston 74.

The pinion 81 is in mesh with a vertically disposed rack bar 84, Fig. 7, which may project through a suitable opening in the top of the box-like housing 65 into an upstanding tubular guard or shield 65a. The rack bar 84 constitutes the upper portion of a rod 85 which extends downwardly through a suitable opening 86 in the bottom 87 of the box-like housing 65 and through a vertically aligned opening 88 in the head 89 of a vertically disposed air cylinder 90. The box-like housing 65 may be mounted upon the head 89 of the cylinder 90. The cylinder 90 is adjustably supported by an adjusting screw 91, Fig. 1, upon a plate 92, Figs. 1 and 3, resting upon the top plate 93 of supporting base structure, generally designated 94, this base structure being only partially shown as it may be part of the framework structure of a forming machine of which the mold 1 is an element or may be part of any other suitable stationary supporting structure. The upright column or pedestal 55 also rests upon this top plate 93 of the base structure 94. A pair of gib bars 95 are fastened by cap bolts 96 and dowels 97 to an upright supporting plate 98, Fig. 1, on a horizontal plate 99 which, at least in part, overlies the plate 92 and may be fastened thereto by welds 100 or in any other suitable known way. The upright plate 98 may be welded, as at 101, Fig. 3, or fastened in any other suitable known way to the horizontal plate 99 and may be braced or stayed, as by the web plate 102, Figs. 1 and 3. When the cap screws 96 have been loosened, the adjustable supporting screw 91 may be turned to adjust vertically the cylinder 90 and all the parts carried thereby, this including one end of the shaft on which the rotatably mounted parts hereinbefore described are mounted. The level of the shaft thus may be adjusted within limits by adjustments of the hereinbefore described adjusting means on the pedestal 55 and the adjusting screw 91. When the cap screws 96 have been tightened, the cylinder will be clamped in adjusted position on the supporting plate 98.

The rod 85 constitutes the rod of a piston 103 in the cylinder 90. The piston 103 is reciprocable under air pressure in the usual manner. A vertically adjustable stop disc 104 is disposed in the cylinder 90 below the piston 103 on a stem 105 depending through an axial opening 106 in the lower cylinder head 107 and being provided with a relatively reduced depending actuating end portion 108 extending downwardly through an opening 109 in the plate 92 into or through an aligned opening 110 in the top plate 93 of the supporting base structure. The stem 105 is in screw threaded engagement, as at 111, with the lower cylinder head 107 and below the latter carries a jam nut 112 which is suitably formed to be grasped and manipulated by hand or by any suitable tool. The lower end of the actuating end portion 108 of the stem 105 is squared or otherwise appropriately shaped as at 108a to be engaged by a socket wrench or other suitable tool when the jam nut 112 has been loosened so as to turn the stem 105 to raise or lower the stop disc 104 in the cylinder 90. This will adjust the lower limit of the path of movement of the piston 103 in the cylinder 90.

The vacuum and positive pressure air lines and passages will now be pointed out as these, in addition to the air motor comprising the cylinder 90 and piston 103, are involved in the operation of the carrier 9 and of the double bottom plates 7 and 8. A positive pressure air line 113 communicates with a vertical passage 114 in a wall of the cylinder 90. This passage communicates through a short radial passage 115 with the interior of the cylinder below the stop disc 104. An angular passage 116 connects the space within the cylinder 90 below the stop disc 104 with the interior of the cylinder above such stop disc at the center of the latter. An additional passage extends vertically at 117 through the stop disc and is enlarged at 118 to provide a chamber for an upwardly opening ball check valve 119. A pin 120 limits upward movement of the ball valve from its seat at the bottom of this chamber. When pressure is applied from the line 113, it will pass through the valved passage 117, 118 to force the piston 103 upwardly until a depending pin 121, at the bottom of the piston 103, has been raised out of the upper end of the angular passage 116. Thereafter, pressure fluid will pass through both the angular passage 116 and the valved passage 117, 118 to impel the piston 103 swiftly upward in the cylinder 90. Return or downward movement of the piston 103 in the cylinder 90 may be effected by pressure fluid supplied above the piston through an angular passage 122 in the upper head 89 of the cylinder, this angular passage opening into the space within the cylinder 90 at its extreme top. A slight recess may be provided in the top wall of this cylinder chamber, as indicated at 123 to provide cushioning of the final portion of each upward stroke of the piston 103. The positive pressure passages to the opposite ends of the cylinder may also serve as exhaust passages at appropriate times. A suitable timer, none shown, may be used to control these applications of positive pressure and exhaust.

The sleeve 62 is provided with diametrically opposite, radial ports 124 and 125, respectively, both of which establish communication between an outer peripheral groove 126 in the sleeve 62 and a peripheral groove 126a in the shaft 60. A longitudinally extending passage 127 in the shaft 60 communicates adjacent to its outer end which is closed, as by a washer 60a, through a radial port 127a with the peripheral groove 126a in the shaft. The passage 127 communicates at its inner end through a radial passage 128 in another portion of the shaft 60 and an aligned passage 129 in the wall of the cylinder 73 with the interior of that cylinder at the far side of the piston 74 from the clutch disc 79. A pressure fluid supply and exhaust pipe 130 is secured at 131 in an apertured top portion of the stationary sleeve 63 in communication with the outer peripheral groove 126 in the sleeve 62. A second pressure fluid supply and exhaust pipe 132 is secured at 133 in another apertured top portion of the stationary sleeve 63 in line longitudinally of such sleeve with the pipe 130. The pipe 132 communicates with a second peripheral groove, 134, in the sleeve 62. The groove 134 communicates through a radial port 135 in the sleeve 62 with a second peripheral groove, 136, in the shaft 60. A radial port 137 in the shaft 60 connects the peripheral groove 136 with a second longitudinal passage 138, in the shaft 60. The passage 138 communicates through another radial port, 139, in the shaft 60 and an aligned passage 140 in the wall of the cylinder 73 with the interior of the latter at the side of the piston 74 nearest to the clutch disc 79. As shown, the port 124 is in register with the pipe 130 and the ports 125 and 127a are in register with each other and 180° out of register with the pipe 130 when the piston 103 is at the lower limit of its stroke in the power cylinder 90. At this time, the second pipe, 132, the port 135 in the sleeve 62 and the port 137 in the shaft 60 are all in register.

It will be apparent from the foregoing description that the pipes 130 and 132 are operatively connected at all times to the far and near ends, respectively, of the cylinder 73. The fluid pressure supply and fluid exhaust periods of these individual pipes may be timed and controlled by any suitable mechanism, not shown, as, for example, by the timing mechanism of the Hartford I. S. machine as disclosed in said Patent 1,911,119. When the cylinder 73 is clutched to the stationary disc 69, as shown in Fig. 3, an upward movement of the piston 103 from the position shown will cause rotation of the sleeve 62 through 180° from the position shown in Fig. 3 without rotation of the shaft on which the carrier 9, Fig. 1, is mounted. Before a subsequent or downward stroke of the piston 103 in the cylinder 90 is initiated, the fluid pressure supply and fluid exhaust functions of the respective pipes 130 and 132 may be reversed to operate the clutch mechanism to effect clutching of the cylinder 73 and hence the carrier shaft to the clutch disc 79 and pinion 81. The subsequent stroke of the piston 103 then will index the carrier through 180°. The clutch mechanism then may be operated by its pneumatic mechanism to release the cylinder 73 and hence the carrier shaft from the disc 79 and to clutch them to the stationary disc 69, the cylinder 73 and the carrier shaft then being in positions turned 180° from those shown in Fig. 3. These operations may be repeated in cyclic order to rotate the carrier 9 intermittently, 180° at a time, as and for the purpose hereinbefore explained. Briefly, each indexing of the carrier 9 through 180° will move the bottom plate that has been in active position in association with the mold 1 and the finally blown article thereon between the open mold halves to the position shown for the bottom plate 8 in Fig. 1 and will move the second bottom plate from the latter position to an active position in cooperation with the mold 1.

Each bottom plate 7 or 8, as shown more clearly in Fig. 8 for the bottom plate 7, comprises a plurality of assembled parts, specifically a core 141, an outer annular part 142 surrounding the upper part of the core above the plate holder socket, and a locking ring 143 surrounding the lower part of the core within the socket and retained therein by the engagement therewith of a spring loaded locking pin 144 which prevents rotation of the assembled plate parts in the socket. A passage 145 in the holder communicates with an axial passage 146 in the bottom plate core 141. From this passage 146, radial passages 147 extend to an annular space 148 between the core 141 and the outer annular plate member 142 and this annular space has a restricted annular opening at 148a through the top of the plate between its core 141 and outer part 142. The passage 145 communicates through a radial port 149 or 150, with a longitudinally extending passage 151 or 152 in the holder supporting shaft 30 or 31. See Fig. 5. The passage 151 communicates with a passage 153 leading through the end portion 24 of the carrier part 22 to a passage 154 in the carrier shaft part 59. The passage 152 communicates with a passage 155 leading through the end portion 23 of the carrier part 22 to a passage 156 in the carrier shaft part 59. See Fig. 4. The passages 154 and 156 are dead end passages and each opens through a radial port 154a or 156a, Figs. 2 and 4, into a slot or groove 157 or 158, which, as shown in Fig. 2, extends arcuately in the periphery of the shaft part 59 for slightly more than 90°, the slots or grooves 157 and 158 lying in the same transverse plane through the shaft and being spaced apart at their adjacent ends by arcuately extending imperforate surface portions or lands 159 and 160, respectively. These are less than 90° in extent angularly around the periphery of the shaft portion 59.

As hereinbefore has been pointed out, the shaft part 59 serves as a rotary core of a valve of which the casing is the sleeve 66. This sleeve is provided with two ports 161 and 162, respectively, located at the top and a side, respectively, of the casing so as to be spaced 90° apart and to lie in the plane of the slots or grooves 157 and 158 and the interposed lands 159 and 160. Vacuum pipes 163 and 164, respectively, are mounted by a ring 165 on the casing 66 so that the pipe 163 communicates with the port 161 and the pipe 164 similarly communicates with the port 162. It will be obvious that when the carrier shaft, including the part 59 constituting the core of the vacuum valve as shown in Fig. 2, is rotated about its axis, as in steps of 180° by the mechanism hereinbefore described, each of the passages 154 and 156 which respectively lead to the individual bottom plates, will be in communication with one or both of the vacuum pipes for slightly more than half of a complete cycle of rotation and that one or the other of these passages will be in communication with at least one of these vacuum pipes while the other is closed off therefrom by one of the lands 159 or 160. The vacuum applications through the pipes 163 and 164 may be timed and controlled by any suitable timing mechanism, not shown, advantageously to coordinate such applications with the operations of the individual bottom plates as such plates are moved in turn to and from the two different stations shown in Fig. 1. Thus, the two plates are both in communication with vacuum pipes when they are temporarily at rest at the positions shown. Vacuum therefore may be applied through either or both plates at this time. On a counterclockwise movement of the carrier shaft through 180°, vacuum may be applied through the plate 7 throughout any or all part of the time that it is being moved from the molding station to the take-out or after-cooling station at which the plate 8 is shown. The plate 8 will be out of vacuum communication of both of the pipes from a time shortly after it leaves the take-out or after-cooling station until it approaches the molding station when communication with a vacuum pipe will be again established. This will enable use of the plate that has assumed an active position at the molding station to aid in exhausting expanding gases from around the incoming parison in the blow mold, the pressure of such gases being a frequent cause of collapse of parisons in the blow mold. Preferably, vacuum in the blow mold from the bottom plate will be applied during at least the final part of the blowing of the article to final form in the blow mold and will be kept on during transportation of the finally blown article from the molding station to the take-out or after-cooling station. The vacuum may be relieved when the article is to be lifted, as by the conventional take-out tongs 14, Fig. 1, from the plate at the take-out or after-cooling station. The vacuum application schedule may be varied as circumstances or service conditions require or as otherwise predetermined.

Many changes in and modifications of the illustrative structure and operations as herein particularly described will now be obvious or readily occur to those skilled in the art and I therefore do not wish to be limited to the details thereof.

I claim:

1. In a glassware forming machine, the combination with a blow mold comprising a pair of cooperative upright sections movable horizontally relative to each other between open and closed positions at a relatively fixed molding station of a pair of bottom plates for said mold, each adapted for cooperative association with said mold to complete a molding cavity within the mold when such bottom plate is horizontally disposed at said molding station and the sections of the mold are closed, a unitary carrier of elongate form, means to mount said bottom plates on the opposite end portions of said carrier, means to mount said carrier to swing about a horizontal axis intermediate its ends and so located in respect to the mold at said molding station that each of said bottom plates is movable by the carrier along a closed path extending along a circle lying in a vertical plane and having a portion passing through a space between the blow mold sections when said sections are in open positions, and means to rotate said carrier about its said axis to cause each of said bottom plates in turn to move along said path from a lower level to its operative position at the molding station, to dwell temporarily in its said operative position at said molding station during which time said mold sections may be closed and subsequently re-opened, and to move from its operative position after said period of dwell upwardly through said space between opened sections of the mold.

2. In a glassware forming machine, the combination with a blow mold comprising a pair of cooperative upright sections movable horizontally relative to each other between open and closed positions at a relatively fixed molding station of a pair of bottom plates for said mold, each adapted for cooperative association with said mold to complete a molding cavity within the mold when such bottom plate is horizontally disposed at said molding station and the sections of the mold are closed, a unitary carrier of elongate form, means to mount said bottom plates on the opposite end portions of said carrier, means to mount said carrier to swing about a horizontal axis intermediate its ends and so located in respect to the mold at said molding station that each of said bottom plates will be presented in turn at said molding station in position for cooperative association with the mold during each cycle of rotation of the carrier about said horizontal axis, and means to rotate said carrier intermittently about its said axis so as to cause each of said bottom plates to dwell temporarily at said molding station, said means to mount said bottom plates on said carrier comprising holder arms carrying the bottom plates, horizontal shafts carried by the ends of the carrier parallel to the axis of rotation of the latter on which said holder arms are mounted to swing about their respective axes, and parallel motion transmissions extending between the horizontal axis of the carrier and the individual axes of the holder arms to maintain the latter substantially horizontal during a complete rotation of the carrier about its axis.

3. The combination specified by claim 1 wherein said bottom plates, said means to mount them on the carrier, said carrier and said means to mount said carrier to swing about a horizontal axis intermediate its ends are cooperatively formed to provide vacuum passages extending from said last-named means through the opposite end portions of the carrier to and through said bottom plates.

4. The combination specified by claim 3 and in addition means operable by rotation of the carrier about its said axis to close each of said vacuum passages during part of each cycle of rotation of the carrier.

5. The combination specified by claim 1 wherein said means to rotate said carrier also is effective to cause each of said bottom plates to dwell temporarily at another station spaced 180° along its path of movement from the molding station.

6. The combination specified by claim 1 wherein said means to rotate said carrier is effective to move each of said bottom plates in turn from said molding station between opened sections of the mold to a second station spaced 180 degrees along its path of movement from the molding station and simultaneously to move the other bottom plate from the second station back to the molding station.

7. The combination specified by claim 6 wherein said means to rotate said carrier comprises a driving mechanism and means including a clutch mechanism for periodically operatively connecting the driving mechanism to said carrier, to effect said movements of said bottom plates between said stations and to disconnect the driving mechanism from said carrier to cause said bottom plates to dwell temporarily at said stations.

8. The combination specified by claim 7 wherein said clutch mechanism locks said carrier against movement while it is disconnected from said driving mechanism.

HUGH C. MacCONNELL, Jr.

REFERENCES CITED

The following references are of record in the file of this patent:

UNITED STATES PATENTS

| Number | Name | Date |
|---|---|---|
| 1,854,408 | Kadow | Apr. 19, 1932 |
| 2,161,750 | Schonwald | June 6, 1939 |
| 2,284,796 | Berthold | June 2, 1942 |
| 2,438,088 | Wyss | Mar. 16, 1948 |